(12) United States Patent
Xie et al.

(10) Patent No.: US 11,073,998 B2
(45) Date of Patent: Jul. 27, 2021

(54) METHOD, APPARATUS FOR PROCESSING DISK BAD SECTOR, AND COMPUTER STORAGE MEDIUM

(71) Applicant: WANGSU SCIENCE & TECHNOLOGY CO., LTD., Shanghai (CN)

(72) Inventors: Jiaxiang Xie, Shanghai (CN); Xu Zhang, Shanghai (CN); Yajuan Zheng, Shanghai (CN); Zhihuai Pan, Shanghai (CN)

(73) Assignee: WANGSU SCIENCE & TECHNOLOGY CO., LTD., Shanghai (CN)

(*) Notice: Subject to any disclaimer, the term of this patent is extended or adjusted under 35 U.S.C. 154(b) by 146 days.

(21) Appl. No.: 16/506,349

(22) Filed: Jul. 9, 2019

(65) Prior Publication Data
US 2019/0332305 A1 Oct. 31, 2019

Related U.S. Application Data

(63) Continuation of application No. PCT/CN2018/091579, filed on Jun. 15, 2018.

(30) Foreign Application Priority Data

Apr. 10, 2018 (CN) .......................... 201810317786.8

(51) Int. Cl.
*G06F 3/06* (2006.01)
*G06F 11/10* (2006.01)
*G11B 20/18* (2006.01)

(52) U.S. Cl.
CPC .......... *G06F 3/0644* (2013.01); *G06F 3/0619* (2013.01); *G06F 3/0653* (2013.01);
(Continued)

(58) Field of Classification Search
None
See application file for complete search history.

(56) References Cited

U.S. PATENT DOCUMENTS 6,058,462 A    5/2000  West et al.
7,653,840 B1*  1/2010  Taylor ................ G06F 11/0727
                                                    714/47.2
(Continued)

FOREIGN PATENT DOCUMENTS

CN    101527142 A    9/2009
CN    103593275 A    2/2014
(Continued)

OTHER PUBLICATIONS

International Search Report for International Application No. PCT/CN2018/091579 dated Jan. 16, 2019.
(Continued)

*Primary Examiner* — Charles J Choi
(74) *Attorney, Agent, or Firm* — Heslin Rothenberg Farley & Mesiti P.C.

(57) ABSTRACT

The present disclosure discloses a method, apparatus for processing a disk bad sector, and a computer storage medium. The method includes: obtaining a target disk that is to be processed, and detecting bad sector data in the target disk; combining bad sector areas represented by the bad sector data, to obtain a usable area different from the bad sector areas in the target disk; and determining, according to a detection result, whether the target disk is usable, reconstructing storage space of the target disk based on the usable area if the target disk is usable, and setting an access parameter for the reconstructed storage space. The technical solutions provided by the present disclosure can improve processing efficiency of a faulty disk while saving a disk resource.

15 Claims, 4 Drawing Sheets

(52) U.S. Cl.
CPC ...... *G06F 11/1088* (2013.01); *G11B 20/1889* (2013.01); *G11B 2020/183* (2013.01)

(56) References Cited

U.S. PATENT DOCUMENTS

| | | |
|---|---|---|
| 2006/0158976 A1 | 7/2006 | Fukunaga et al. |
| 2008/0155316 A1 | 7/2008 | Pawar et al. |
| 2012/0087033 A1* | 4/2012 | Yang ................. G11B 5/012 |
| | | 360/39 |

FOREIGN PATENT DOCUMENTS

| | | |
|---|---|---|
| CN | 104484251 A | 4/2015 |
| CN | 105279057 A | 1/2016 |
| CN | 107015877 A | 8/2017 |
| CN | 107807862 A | 3/2018 |

OTHER PUBLICATIONS

Search Report for Chinese Patent Application No. 201810317786.8 dated Feb. 3, 2020.
Extended European Search Report for European Patent Application No. 18889973.6 dated Apr. 20, 2021.

\* cited by examiner

METHOD, APPARATUS FOR PROCESSING DISK BAD SECTOR, AND COMPUTER STORAGE MEDIUM

CROSS-REFERENCE TO RELATED APPLICATION

The application claims priority to, and is a continuation of, International Application Serial No. PCT/CN2018/091579, filed on Jun. 15, 2018, which claims priority to Chinese Application No. 201810317786.8 filed on Apr. 10, 2018. The specification of each of the aforementioned applications are incorporated herein by reference in their entireties.

TECHNICAL FIELD

The present disclosure relates to the field of hardware device detection technologies, and in particular, to a method, apparatus for processing a disk bad sector, and a computer storage medium.

BACKGROUND

Currently, in some large-scale distributed application environments, there is a huge quantity of disks and the disks are relatively scattered. Therefore, it is relatively difficult to maintain the disks. For example, in a content delivery network, when a disk is faulty, usually, a person is arranged to replace the faulty disk only after the disk is offline or severely affects a service/service quality. Such processing has the following disadvantages: processing efficiency is relatively low when a disk is faulty; and moreover, a disk bad sector is a common disk fault, and if a new disk is used to replace a disk that has only a few bad sectors, relatively severer resource waste will be caused.

SUMMARY

An objective of the present disclosure is to provide a method and an apparatus for processing a disk bad sector, and a computer storage medium, which can improve processing efficiency of a faulty disk while saving a disk resource.

To achieve the foregoing objective, an aspect of the present disclosure provides a method for processing a disk bad sector. The method includes: obtaining a target disk that is to be processed, and detecting bad sector data in the target disk; combining bad sector areas represented by the bad sector data, to obtain a usable area different from the bad sector areas in the target disk; and determining, according to a detection result, whether the target disk is usable, reconstructing storage space of the target disk based on the usable area if the target disk is usable, and setting an access parameter for the reconstructed storage space.

To achieve the foregoing objective, another aspect of the present disclosure further provides an apparatus for processing a disk bad sector. The apparatus includes: a disk detection unit, configured to: obtain a target disk that is to be processed, and detect bad sector data in the target disk; a bad sector isolation unit, configured to combine bad sector areas represented by the bad sector data, to obtain a usable area different from the bad sector areas in the target disk; and a space reconstruction unit, configured to: determine, according to a detection result, whether the target disk is usable, reconstruct storage space of the target disk based on the usable area if the target disk is usable, and set an access parameter for the reconstructed storage space.

To achieve the foregoing objective, another aspect of the present disclosure further provides an apparatus for processing a disk bad sector. The apparatus includes a memory and a processor, where the memory is configured to store a computer program, and when the computer program is executed by the processor, the foregoing method is performed.

To achieve the foregoing objective, another aspect of the present disclosure further provides a computer storage medium. The computer storage medium is configured to store a computer program, and when the computer program is executed by a processor, the foregoing method is performed.

As can be seen from the above, according to the technical solutions provided by the present disclosure, whether a target disk needs a bad sector test can be automatically recognized. Specifically, health status information of the target disk may be periodically obtained, and the health status information is analyzed to determine whether the target disk needs the bad sector test. When the bad sector test needs to be performed, bad sector areas represented by bad sector data may be combined, and the combined bad sector areas may be isolated in the target disk, to obtain usable areas with the bad sector areas sorted out. Due to existence of the bad sector areas, the usable areas are likely to be discrete in the target disk. In this case, to normally use the usable areas in the target disk, storage space of the target disk may be reconstructed based on the usable areas, and an access parameter is set for the reconstructed storage space. Specifically, the target disk may be divided into a plurality of partitions according to the usable areas, and the plurality of partitions is combined into one volume. After the volume obtained after the combination is formatted, a volume label and a mount point of the formatted volume may still be an original volume label and an original mount point the target disk, thereby completing a processing process for the faulty disk. In the processed disk, use of a normal area is not affected due to isolation of the bad sector areas. As can be seen, according to the technical solutions provided by the present disclosure, when there are a few bad sectors, it is not necessary to replace an entire disk. Instead, the bad sectors are isolated, and usable areas are fully used. Therefore, processing efficiency of a faulty disk can be improved while a disk resource is saved.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following descriptions merely show some embodiments of the present disclosure, and a person of ordinary skill in the art may still derive other drawings from these accompanying drawings without creative efforts.

DETAILED DESCRIPTION

To make the objective, technical solutions and advantages of the present disclosure clearer, the following further describes the embodiments of the present disclosure in detail with reference to the accompanying drawings.

Example 1

Figure 1:
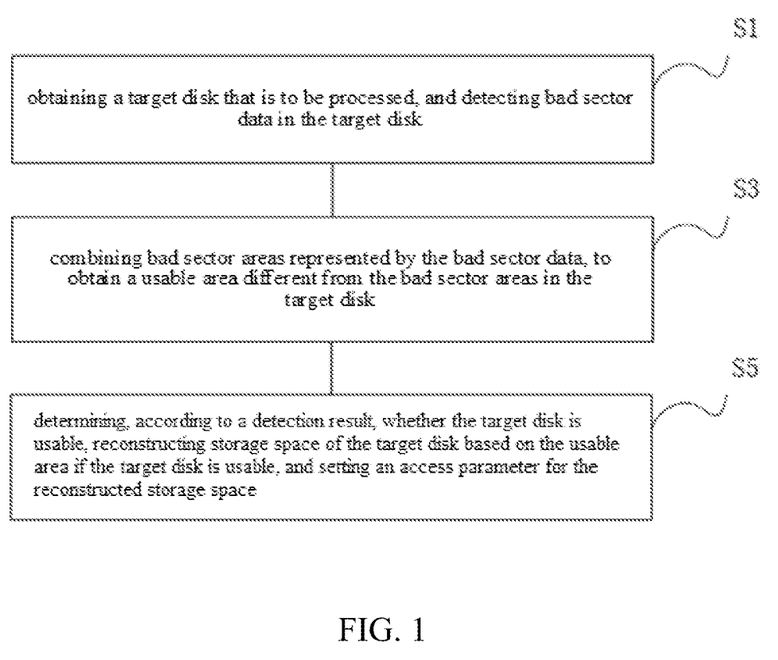
FIG. 1 is a steps diagram of a method for processing a disk bad sector according to an embodiment of the present disclosure.
Figure 2:
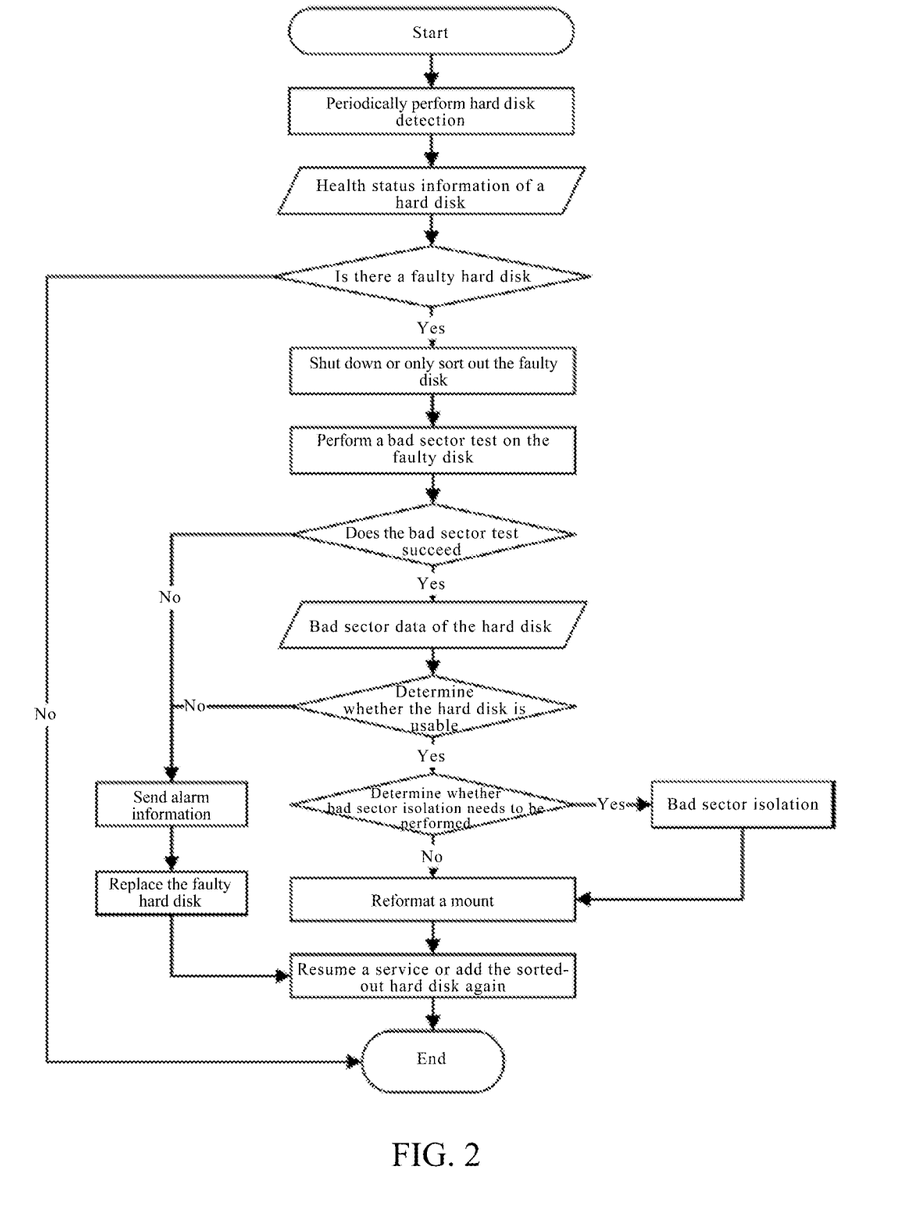
FIG. 2 is a flowchart of a method for processing a disk bad sector according to an embodiment of the present disclosure.

The present disclosure provides a method for processing a disk bad sector. Referring to FIG. 1 and FIG. 2, the method may include the following steps.

S1: obtaining a target disk that is to be processed, and detecting bad sector data in the target disk.

In an example, a disk status monitoring script may be periodically executed. When the script is executed, health status information of the target disk may be obtained. In actual application, the health status information of the target disk includes at least one of self-test information of the target disk, log information of an operating system in which the target disk is located, and input/output load information of the target disk. The self-test information may be self-monitoring analysis and reporting technology (S.M.A.R.T) information of the target disk. The S.M.A.R.T information may be reserved in a system reservation area (a service area) of a hard disk. In an S.M.A.R.T standard, binary code may be used as a basic command of an S.M.A.R.T, and the command is stipulated to be written into a standard register, to form a particular S.M.A.R.T information table for normal detection and operation. S.M.A.R.T commands may be divided into a command and a subcommand. The command mainly provides information about whether a device supports the S.M.A.R.T or information indicating ignoring a command feature. While the subcommand provides detection information of a device supporting the S.M.A.R.T. In the S.M.A.R.T information, whether a target hard disk fails (FAIL) may be displayed, and whether an error occurs on the target disk during operation may further be displayed. Moreover, whether a large quantity of errors (the quantity of errors is at least 200) occur on the target disk may be determined according to a quantity of errors. The log information may be message information of the operating system. The information may indicate whether a read/write error and a file system error occur on the target disk. The input/output load information may indicate whether the target disk is in a high-load operating state.

In an example, possible operating statuses of the target disk may be preset. Then, determining results corresponding to the operating statuses are respectively determined based on the health status information of the target disk, to obtain a determining result combination of the target disk. For example, referring to Table 1, Table 1 shows a plurality of operating statuses and possible determining results in the operating statuses. Each row may be used as one determining result combination.

TABLE 1

| Hard disk fault determining analysis table | | | | | | |
|---|---|---|---|---|---|---|
| FAIL or not | High load | SMART error | Large quantity of SMART errors | Message disk error | Message file system error | Processing action |
| Yes | Random | Random | Random | Random | Random | Replace |
| No | Yes | Random | Yes | Random | Random | Replace |
| No | Yes | Yes | No | Random | Random | Bad sector test |
| No | Yes | Random | No | Yes | Random | Bad sector test |
| No | Yes | No | No | No | Yes | Format |
| No | No | Random | Random | Random | Random | No processing |

In an example, when the actual determining result combination of the target disk is obtained, a preset processing policy corresponding to the determining result combination may be invoked. The preset processing policy may be used to represent whether the target disk needs the bad sector test. As shown in Table 1, the preset processing policy may be information in "processing action", and may correspond to different processing actions according to different determining result combinations.

S3: combining bad sector areas represented by the bad sector data, to obtain a usable area different from the bad sector areas in the target disk.

In an example, when a determining result indicates that the target disk needs the bad sector test, a service in the target disk or a service in a server in which the target disk is located may be aborted. For example, the target disk may be temporarily sorted out from the server, or the server in which the target disk is located is directly shut down. In this way, when the bad sector test is performed on the target disk, an execution process of a normal service is not affected.

In an example, when the bad sector test is performed on the target disk, a logical bad sector in the target disk may be repaired first. Finally, bad sector data corresponding to a bad sector that cannot be repaired may be saved to a specified file. The specified file may be a file that is preset in the operating system. Subsequently, when the bad sector data is analyzed, the bad sector data in the specified file may be read through an access path of the specified file.

In an example, after a process of the bad sector test is completed, the bad sector data in the specified file may be analyzed. In actual application, the bad sector data may be a one-dimensional nonnegative integer array. The array may include a plurality of elements. Each element may represent a bad sector having a capacity of 4 KB. In addition, an element value of the element may represent a position of a bad sector in the target disk. For example, an element value N (an integer starting from 0) may represent an $(N+1)^{th}$ area having a capacity of 4 KB in the target disk.

Figure 3:
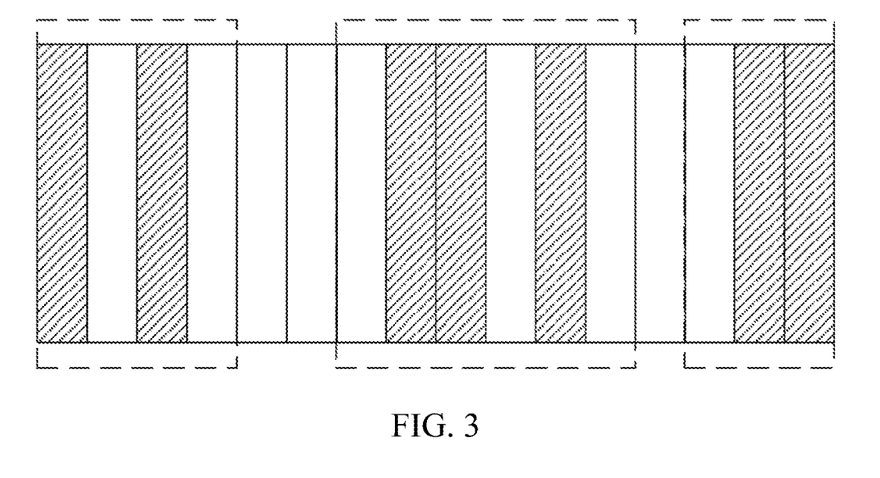
FIG. 3 is a schematic diagram of bad sector isolation according to an embodiment of the present disclosure.

In an example, an area in which a bad sector is located may be covered by using an area that is as small as possible, and the area covering the bad sector is isolated in the target disk, to obtain a usable area that can be normally used in the target disk. Specifically, storage space of the target disk may be divided into a specified quantity of sub-areas in advance. For example, the target disk may be evenly divided into 100 sub-areas. The 100 sub-areas may be represented by using numbers from 0 to 99. 0 may represent 0 to 1% of storage space, 1 may represent 1% to 2% of storage space, and the rest can be deduced by analogy. Then, a target sub-area corresponding to each element value in the bad sector data may be determined in the specified quantity of sub-areas. Specifically, first, 4 KB is used as a unit to determine a total capacity of the target disk (a quantity of 4 KB included in an actual capacity of the target disk). Then, the element value is divided by the total capacity of the target disk. Subsequently, rounding is performed on an obtained result, so that a sub-area specifically corresponding to the element value may be determined. In this way, each determined target sub-area may be used as a sub-area having a bad sector. Referring to FIG. 3, sub-areas with shadow in FIG. 3 may be used as target sub-areas having bad sectors.

In an example, after target sub-areas in which the bad sectors are located are determined, to avoid that areas of the bad sectors are excessively discrete, two neighboring target sub-areas spaced from each other by an interval satisfying a specified condition may be combined, to obtain a plurality of combined areas. Specifically, when the target sub-areas are combined, an adapted area may be used to cover a plurality of target sub-areas spaced from each other by an interval satisfying the specified condition. That the interval satisfies the specified condition may be that a quantity of sub-areas between the two neighboring target sub-areas is less than or equal to a specified quantity threshold. For example, if the specified quantity threshold is 2 (2% of the total capacity of the target disk), the two neighboring target sub-areas may be combined provided that there are less than two sub-areas between the two neighboring target sub-areas. Referring to FIG. 3, the first target sub-area and the second target sub-area are spaced from each other by one sub-area. Therefore, the two target sub-areas may be combined. When the two target sub-areas are combined, the sub-area between the two target sub-areas also needs to be combined together. Therefore, the combined area obtained after the initial combination may include three sub-areas. Similarly, because the second target sub-area and the third target sub-area are spaced from each other by four sub-areas, the combination condition is not satisfied. Therefore, the second target sub-area and the third target sub-area are not combined. Because the third target sub-area, the fourth target sub-area, and the fifth target sub-area all satisfy the combination condition, the three target sub-areas together with the sub-areas between the three target sub-areas are combined. A combined area obtained after the combination may include four sub-areas.

In an example, after the target sub-areas are combined into the combined areas, an isolated area may be determined in a head portion and/or a tail portion of each combined area. For example, the isolated area may be one sub-area (1% of the total capacity of the target disk), and a combination of the combined area and the isolated area is used as a bad sector area obtained after the combination. For example, in FIG. 3, because the first combined area is at a head portion of the target disk, a sub-area is used as an isolated area only at a tail portion of the combined area. In this way, four sub-areas in the dashed box may be used as a bad sector area finally. Similarly, because the second combined area is in the middle of the target disk, sub-areas may be determined at both a head portion and tail portion to serve as isolated areas. In this way, six sub-areas in the dashed box may be used as a bad sector area.

In an example, after a bad sector is isolated and the bad sector areas are obtained, an area different from the bad sector areas is sorted out from the target disk, to serve as a usable area.

In an embodiment of the present disclosure, if a process of the bad sector test cannot be completed within specified duration, alarm information may be sent, to instruct an administrator to directly change the disk. For example, if the process of the bad sector test has not been completed over 48 hours, it indicates that there are excessively many bad sectors in the disk or a severer read/write error occurs on the disk. Therefore, a bad sector isolation process may be abandoned, and the disk is directly changed.

S5: determining, according to a detection result, whether the target disk is usable, reconstructing storage space of the target disk based on the usable area if the target disk is usable, and setting an access parameter for the reconstructed storage space.

In an example, after a bad sector is detected and isolated, whether the target disk can still be used may be determined according to the detection result. Specifically, a quantity of bad sectors, a space capacity of the usable area, and a quantity of partitions of the usable area may be comprehensively considered. If a quantity of detected bad sectors is greater than a specified bad sector quantity threshold, or a space capacity of the obtained usable area is less than a specified capacity threshold, or a quantity of partitions obtained after partitioning is performed according to the usable area is greater than a specified partition quantity threshold, it may be determined that the target disk is unusable. For example, if there are more than 200 bad sectors, or the space capacity of the usable area is lower than 90% of the total capacity of the target disk, or there are more than four partitions of the usable area, it is determined that the target disk is unusable. On the contrary, if a quantity of detected bad sectors is less than or equal to a specified bad sector quantity threshold, a space capacity of the obtained usable area is greater than or equal to a specified capacity threshold, and a quantity of partitions obtained after partitioning is performed according to the usable area is less than or equal to a specified partition quantity threshold, it may be determined that the target disk is usable. For example, if there are less than 200 bad sectors, or the space capacity of the usable area is not lower than 90% of the total capacity of the target disk, or there are less than four partitions of the usable area, it is determined that the target disk is usable.

In an example, the alarm information may be sent for an unusable target disk, to instruct an administrator to change the disk. For a usable target disk, the target disk may be divided into a plurality of partitions according to the usable area. Specifically, a plurality of consecutive usable areas may be divided as one partition. For example, in FIG. 3, blank sub-areas outside the dashed boxes are all used as usable areas. The remaining usable areas are divided into two partitions. The first partition includes two sub-areas, and the second partition includes only one sub-area. After the usable area is divided into the plurality of partitions, the plurality of partitions may be combined into one volume by using a logical volume manager (LVM) function, and the volume obtained after the combination is used as the reconstructed storage space.

In an example, before the bad sector data in the target disk is detected, a volume label and a mount point of the target disk may be recorded. In this way, after the reconstructed storage space is obtained, the reconstructed storage space may be formatted, and the volume label and the mount point of the target disk that are recorded are respectively set to a volume label and a mount point of the formatted storage space, thereby completing a setting process of the access parameter.

In an example, a target disk on which bad sector isolation and volume combination processing are completed can still be used. Therefore, a service in the target disk or a service in a server in which the target disk is located can be resumed.

Example 2

The present disclosure further provides an apparatus for processing a disk bad sector. The apparatus includes:

a disk detection unit, configured to: obtain a target disk that is to be processed, and detect bad sector data in the target disk;

a bad sector isolation unit, configured to combine bad sector areas represented by the bad sector data, to obtain a usable area different from the bad sector areas in the target disk; and a space reconstruction unit, configured to: determine, according to a detection result, whether the target disk is usable, reconstruct storage space of the target disk based on the usable area if the target disk is usable, and set an access parameter for the reconstructed storage space.

In an embodiment of the present disclosure, the bad sector data includes at least one element value used to represent a position of a bad sector in the target disk; and correspondingly, the bad sector isolation unit includes:

a sub-area division module, configured to divide the storage space of the target disk into a specified quantity of sub-areas in advance;

a target sub-area determining module, configured to determine, in the specified quantity of sub-areas, a target sub-area corresponding to each element value in the bad sector data;

an area combination module, configured to combine two neighboring target sub-areas spaced from each other by an interval satisfying a specified condition, to obtain a plurality of combined areas; and an isolated area setting module, configured to determine isolated areas in head portions and/or tail portions of the combined areas, and combining the combined areas with the isolated areas to serve as the bad sector areas obtained after the combination.

In an embodiment of the present disclosure, the space reconstruction unit includes:

a partition division module, configured to divide the target disk into a plurality of partitions according to the usable area; and a volume combination module, configured to: combine the plurality of partitions into one volume, and use the volume obtained after the combination as the reconstructed storage space.

In an embodiment of the present disclosure, the apparatus further includes:

a parameter recording unit, configured to record a volume label and a mount point of the target disk, where correspondingly, the space reconstruction unit further includes:

a parameter reset module, configured to: format the reconstructed storage space, and respectively set, to a volume label and a mount point of the formatted storage space, the volume label and the mount point of the target disk that are recorded.

Example 3

Figure 4:
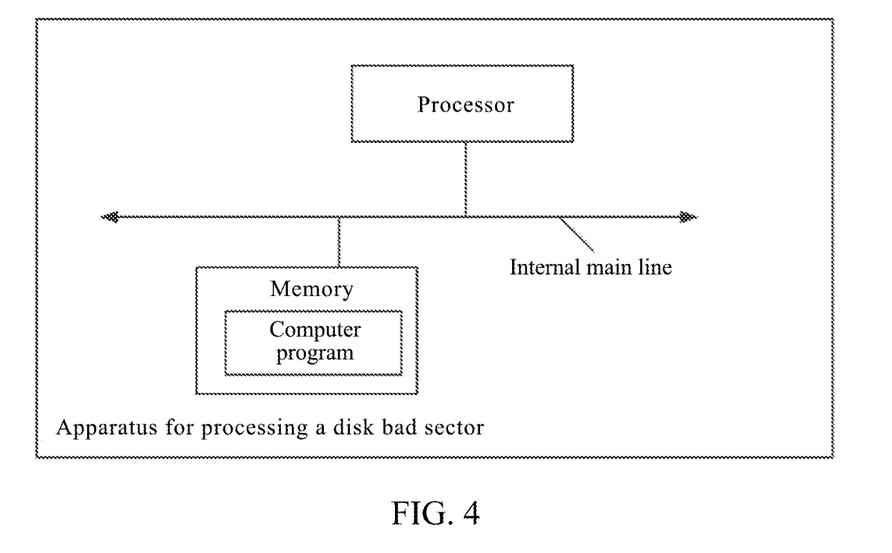
FIG. 4 is a schematic structural diagram of an apparatus for processing a disk bad sector according to an embodiment of the present disclosure.

Referring to FIG. 4, the present disclosure further provides an apparatus for processing a disk bad sector. The apparatus includes a memory and a processor, where the memory is configured to store a computer program, and when the computer program is executed by the processor, the foregoing method for processing a disk bad sector may be performed.

In an example, the memory may include a physical apparatus configured to store information. Usually, after being digitized, the information is stored in media using electrical, magnetic, and optical methods, or the like. The memory In an example may include: an apparatus storing information by using electric energy, for example, a RAM or a ROM; an apparatus storing information by using magnetic energy, for example, a hard disk, a floppy disk, a magnetic tape, a magnetic core memory, a bubble memory, or a USB flash drive; and an apparatus storing information in an optical manner, for example, a CD or a DVD. Certainly, there are other computer storage mediums, for example, a quantum memory and a graphene memory.

In an example, the processor may be implemented in any suitable manner. For example, the processor may be, for example, a microprocessor or a processor, a computer-readable medium storing computer readable program code (for example, software or firmware) that can be executed by the (micro)processor, a logic gate, a switch, an application-specific integrated circuit (ASIC), a programmable logical controller, or an embedded microcontroller.

To achieve the foregoing objective, another aspect of the present disclosure further provides a computer storage medium. The computer storage medium is configured to store a computer program, and when the computer program is executed by a processor, the foregoing method is performed.

For specific functions implemented by the apparatus for processing a disk bad sector and the computer storage medium that are provided in this embodiment of the present disclosure, mutual reference may be made to the foregoing method embodiments of the present disclosure, technical effects of the foregoing method embodiments can be achieved, and details are not described herein again.

Figure 5:
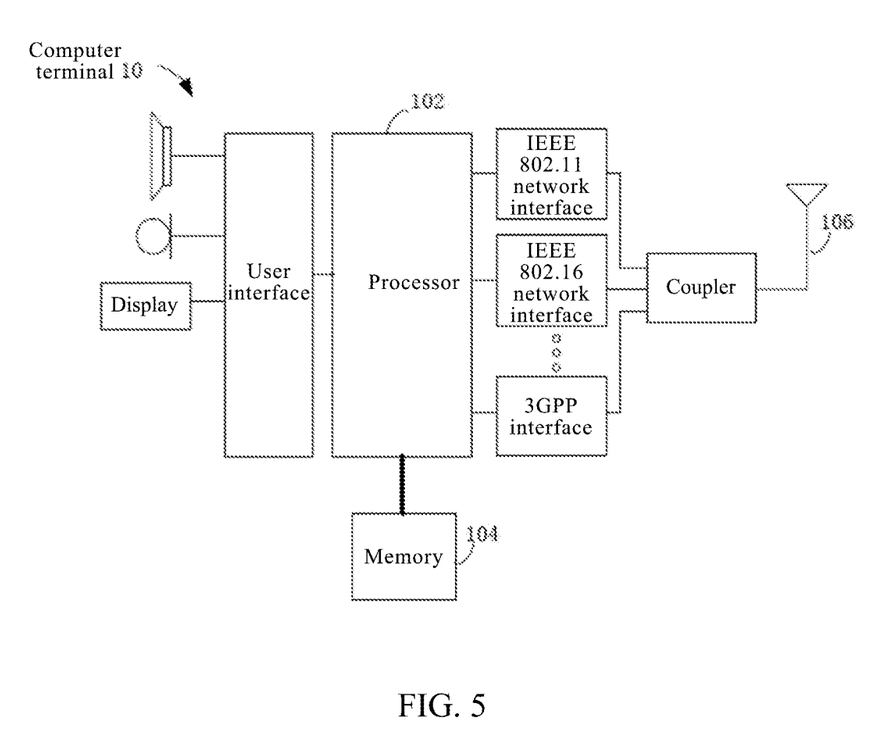
FIG. 5 is a schematic structural diagram of a computer terminal according to an embodiment of the present disclosure.

Referring to FIG. 5, in the present disclosure, the technical solutions in the foregoing embodiments may be applied to a computer terminal 10 shown in FIG. 5. The computer terminal 10 may include: one or more (only one shown in the figure) processors 102 (the processor 102 may include, but is not limited to, a processing apparatus such as a microprocessor MCU or a programmable logic device FPGA), a memory 104 configured to store data, and a transmission module 106 used for a communication function. A person of ordinary skill in the art may understand that FIG. 5 merely shows a schematic structure, and does not constitute any limitation to the structure of the foregoing electronic apparatus. For example, the computer terminal 10 may also include more or fewer components than those shown in FIG. 5, or have a configuration different from that shown in FIG. 5.

The memory 104 may be configured to store a software program and module of an application program. The processor 102 runs the software program and module stored in the memory 104, thereby implementing various function applications and data processing. The memory 104 may include a high-speed random memory, and may further include a nonvolatile memory such as one or more magnetic storage devices, a flash memory, or another nonvolatile solid-state memory. In some embodiments of the present disclosure, the memory 104 may further include memories remotely disposed relative to the processor 102, and these remote memories may be connected to the computer terminal 10 through a network. Instances of the network include, but are not limited to, the Internet, an intranet, a local area network, a mobile communications network, and a combination thereof.

The computer program in the foregoing embodiments of the present disclosure may be stored in the memory 104, and the memory 104 may be coupled to the processor 102, so that the processor 102 can read the computer program from the memory 104 and executes the computer program, thereby implementing the foregoing technical solutions in the present disclosure.

The transmission apparatus 106 is configured to receive or send data through a network. The foregoing instances of the network may include a wireless network provided by a communication provider of the computer terminal 10. In an example, the transmission apparatus 106 includes one network adapter (Network Interface Controller, NIC), which can be connected to another network device through a base station to communicate with the Internet. In another example, the transmission apparatus 106 may be a radio frequency RF) module, which is configured to communicate with the Internet in a wireless manner.

As can be seen from the above, according to the technical solutions provided by the present disclosure, whether a target disk needs a bad sector test can be automatically recognized. Specifically, health status information of the target disk may be periodically obtained, and the health status information is analyzed to determine whether the target disk needs the bad sector test. When the bad sector test needs to be performed, bad sector areas represented by bad sector data may be combined, and the combined bad sector areas may be isolated in the target disk, to obtain usable areas with the bad sector areas sorted out. Due to existence of the bad sector areas, the usable areas are likely to be discrete in the target disk. In this case, in order to normally use the usable areas in the target disk, storage space of the target disk may be reconstructed based on the usable areas and an access parameter is set for the reconstructed storage space. Specifically, the target disk may be divided into a plurality of partitions according to the usable areas, and the plurality of partitions is combined into one volume. After the volume obtained after the combination is formatted, a volume label and a mount point of the formatted volume may still be an original volume label and an original mount point the target disk, thereby completing a processing process for the faulty disk. In the processed disk, use of a normal area is not affected due to isolation of the bad sector areas. As can be seen, according to the technical solutions provided by the present disclosure, when there are a few bad sectors, it is not necessary to replace an entire disk. Instead, the bad sectors are isolated, and usable areas are fully used. Therefore, processing efficiency of a faulty disk can be improved while a disk resource is saved.

Through the description of the foregoing embodiments of the present disclosure, a person of ordinary skill in the art may clearly understand that each embodiment of the present disclosure may be implemented by using software plus a necessary general hardware platform, or may be implemented by using hardware. Based on such understanding, the foregoing technical solutions essentially or the part contributing to the prior art may be reflected in a form of a software product, and the computer software product may be stored in a computer readable storage medium, such as a ROM/RAM, a magnetic disk, or an optical disc, and include a plurality of instructions for enabling a computer device (which may be a personal computer, a server, or a network device) to execute each embodiment or the method of some embodiments.

The foregoing descriptions are merely preferred embodiments of the present disclosure, but are not intended to limit the present disclosure. Any modification, equivalent replacement, or improvement made within the principle of the present disclosure shall fall within the protection scope of the present disclosure.

What is claimed is:

1. A method for processing a disk bad sector, comprising:
   obtaining a target disk that is to be processed, and detecting bad sector data in the target disk;
   combining bad sector areas represented by the bad sector data, to obtain a usable area different from the bad sector areas in the target disk; and
   determining, according to a detection result, whether the target disk is usable, reconstructing storage space of the target disk based on the usable area if the target disk is usable, and setting an access parameter for the reconstructed storage space;
   wherein the bad sector data comprises at least one element value used to represent a position of a bad sector in the target disk; and combining bad sector areas represented by the bad sector data comprises:
      dividing the storage space of the target disk into a specified quantity of sub-areas in advance;
      determining, in the specified quantity of sub-areas, a target sub-area corresponding to each of the at least one element value in the bad sector data;
      combining two neighboring target sub-areas spaced from each other by an interval satisfying a specified condition, to obtain a plurality of combined areas; and
      determining isolated areas in one or both of head portions and tail portions of each of the combined areas, and combining the combined areas with the isolated areas to serve as the bad sector areas obtained after the combination;
   wherein the reconstructing storage space of the target disk based on the usable area includes:
      dividing the target disk into a plurality of partitions according to the usable area; and
      combining the plurality of partitions into one volume, and using the volume obtained after the combination as the reconstructed storage space.

2. The method according to claim 1, wherein after the obtaining a target disk that is to be processed, the method further comprises:
   obtaining health status information of the target disk, and determining, based on the health status information, whether the target disk needs a bad sector test; and correspondingly, when the target disk needs the bad sector test, detecting the bad sector data in the target disk.

3. The method according to claim 2, wherein the health status information of the target disk comprises at least one of self-test information of the target disk, log information of an operating system in which the target disk is located, and input/output load information of the target disk; and
   correspondingly, the determining, based on the health status information, whether the target disk needs a bad sector test comprises:
      presetting a plurality of operating statuses corresponding to the target disk, and respectively determining, based on the health status information of the target disk, determining results corresponding to the operating statuses, to obtain a determining result combination of the target disk; and invoking a preset processing policy corresponding to the determining result combination, wherein the preset processing policy is used to represent whether the target disk needs the bad sector test.

4. The method according to claim 1, wherein the detecting bad sector data in the target disk further comprises:
repairing a logical bad sector in the target disk, and saving, to a specified file, bad sector data corresponding to a bad sector that cannot be repaired.

5. The method according to claim 1, wherein that the interval satisfies the specified condition comprises:
a quantity of sub-areas between the two neighboring target sub-areas is less than or equal to a specified quantity threshold.

6. The method according to claim 1, wherein before the detecting bad sector data in the target disk, the method further comprises:
recording a volume label and a mount point of the target disk; and
correspondingly, the setting an access parameter for the reconstructed storage space comprises:
formatting the reconstructed storage space, and respectively setting, to a volume label and a mount point of the formatted storage space, the volume label and the mount point of the target disk that are recorded.

7. The method according to claim 1, wherein the determining, according to a detection result, whether the target disk is usable comprises:
if a quantity of detected bad sectors is greater than a specified bad sector quantity threshold, a space capacity of the obtained usable area is less than a specified capacity threshold, or a quantity of partitions obtained after partitioning is performed according to the usable area is greater than a specified partition quantity threshold, determining that the target disk is unusable; or
if a quantity of detected bad sectors is less than or equal to a specified bad sector quantity threshold, a space capacity of the obtained usable area is greater than or equal to a specified capacity threshold, and a quantity of partitions obtained after partitioning is performed according to the usable area is less than or equal to a specified partition quantity threshold, determining that the target disk is usable.

8. The method according to claim 1, wherein before the detecting bad sector data in the target disk, the method further comprises:
aborting a service in the target disk or aborting a service in a server in which the target disk is located; and
correspondingly, after the setting an access parameter for the reconstructed storage space, the method further comprises:
resuming a service in the target disk or a service in the server in which the target disk is located.

9. An apparatus for processing a disk bad sector, comprising: a memory and at least one processor coupled to the memory, wherein the least one processor is configured to execute instructions stored in the memory to
obtain a target disk that is to be processed, and detect bad sector data in the target disk, wherein the bad sector data comprises at least one element value used to represent a position of a bad sector in the target disk;
divide a storage space of the target disk into a specified quantity of sub-areas in advance;

determine, in the specified quantity of sub-areas, a target sub-area corresponding to each of the at least one element value in the bad sector data;
combine two neighboring target sub-areas spaced from each other by an interval satisfying a specified condition, to obtain a plurality of combined areas;
determine isolated areas in one or both of head portions and tail portions of each of the combined areas, and combine the combined areas with the isolated areas to serve as the bad sector areas obtained after the combination so as to obtain a usable area different from the bad sector areas in the target disk;
determine, according to a detection result, whether the target disk is usable;
in response to determining that the target disk is usable, divide the target disk into a plurality of partitions according to the usable area, combine the plurality of partitions into one volume, and use the volume obtained after the combination as a reconstructed storage space; and
set an access parameter for the reconstructed storage space.

10. The apparatus according to claim 9, wherein the at least one processor is further configured to
record a volume label and a mount point of the target disk;
format the reconstructed storage space, and respectively set, to a volume label and a mount point of the formatted storage space, the volume label and the mount point of the target disk that are recorded.

11. A non-transitory computer storage medium, wherein the computer storage medium is configured to store a computer program which, when executed by a processor, causes the processor to perform a method for processing a disk bad sector; wherein the method comprises:
obtaining a target disk that is to be processed, and detecting bad sector data in the target disk;
combining bad sector areas represented by the bad sector data, to obtain a usable area different from the bad sector areas in the target disk; and
determining, according to a detection result, whether the target disk is usable, reconstructing storage space of the target disk based on the usable area if the target disk is usable, and setting an access parameter for the reconstructed storage space;
wherein the bad sector data comprises at least one element value used to represent a position of a bad sector in the target disk; and combining bad sector areas represented by the bad sector data comprises:
dividing the storage space of the target disk into a specified quantity of sub-areas in advance;
determining, in the specified quantity of sub-areas, a target sub-area corresponding to each of the at least one element value in the bad sector data;
combining two neighboring target sub-areas spaced from each other by an interval satisfying a specified condition, to obtain a plurality of combined areas; and
determining isolated areas in one or both of head portions and tail portions of each of the combined areas, and combining the combined areas with the isolated areas to serve as the bad sector areas obtained after the combination;
wherein the reconstructing storage space of the target disk based on the usable area comprises:
dividing the target disk into a plurality of partitions according to the usable area; and combining the plurality of partitions into one volume, and using the volume obtained after the combination as the reconstructed storage space.

12. The non-transitory computer storage medium according to claim 11, wherein after the obtaining a target disk that is to be processed, the method further comprises:
   obtaining health status information of the target disk, and determining, based on the health status information, whether the target disk needs a bad sector test; and correspondingly, when the target disk needs the bad sector test, detecting the bad sector data in the target disk.

13. The non-transitory computer storage medium according to claim 12, wherein the health status information of the target disk comprises at least one of self-test information of the target disk, log information of an operating system in which the target disk is located, and input/output load information of the target disk; and
   correspondingly, the determining, based on the health status information, whether the target disk needs a bad sector test comprises:
   presetting a plurality of operating statuses corresponding to the target disk, and respectively determining, based on the health status information of the target disk, determining results corresponding to the operating statuses, to obtain a determining result combination of the target disk; and
   invoking a preset processing policy corresponding to the determining result combination, wherein the preset processing policy is used to represent whether the target disk needs the bad sector test.

14. The non-transitory computer storage medium according to claim 11, wherein the detecting bad sector data in the target disk further comprises:
   repairing a logical bad sector in the target disk, and saving, to a specified file, bad sector data corresponding to a bad sector that cannot be repaired.

15. The non-transitory computer storage medium according to claim 11, wherein that the interval satisfies the specified condition comprises:
   a quantity of sub-areas between the two neighboring target sub-areas is less than or equal to a specified quantity threshold.

* * * * *